United States Patent [19]

O'Mahony

[11] Patent Number: 5,392,334

[45] Date of Patent: Feb. 21, 1995

[54] OFF-HOOK DETECTION AND SOFT LINE SEIZURE FOR TELEPHONE LINE SHARING IN A COMPUTER SYSTEM

[75] Inventor: Barry O'Mahony, Banks, Oreg.

[73] Assignee: Intel Corporation, Santa Clara, Calif.

[21] Appl. No.: 111,719

[22] Filed: Aug. 25, 1993

[51] Int. Cl.$^6$ .............................................. H04M 9/02
[52] U.S. Cl. ........................................ 379/67; 379/93;
379/100; 379/88
[58] Field of Search ................... 379/93, 100, 67, 88

[56] References Cited

U.S. PATENT DOCUMENTS

| | | | |
|---|---|---|---|
| 5,036,534 | 7/1991 | Gural | 379/100 |
| 5,062,133 | 10/1991 | Melrose | 379/104 |
| 5,151,972 | 9/1992 | Lorenz | 379/100 |
| 5,265,157 | 11/1993 | Jolissaint | 379/100 |
| 5,283,638 | 2/1994 | Engberg | 379/100 |

*Primary Examiner*—James L. Dwyer
*Assistant Examiner*—Michael N. Lau
*Attorney, Agent, or Firm*—Blakely, Sokoloff, Taylor & Zafman

[57] ABSTRACT

A method for processing an incoming call on a telephone line in a computer system, wherein a telephony circuit detects a pick-up by a parallel device coupled to the telephone line while maintaining high voltage isolation. The telephony circuit performs hard line seizures to cause the parallel device to hang-up and soft line seizures to prevent a central office hang up after the parallel device hangs up.

20 Claims, 7 Drawing Sheets

*Figure 7*

OFF-HOOK DETECTION AND SOFT LINE SEIZURE FOR TELEPHONE LINE SHARING IN A COMPUTER SYSTEM

BACKGROUND OF THE INVENTION

1. Field of the Invention

The present invention pertains to the field of personal computer systems. More particularly, this invention relates to a personal computer system telephone line sharing among voice, data modem, and fax calls.

2. Art Background

Non dedicated telephone lines are often employed in small office or home office environments to provide voice, modem, and fax communication for a personal computer, as well as for other telephone devices that are present. The personal computer typically employs one non dedicated telephone line to receive modem and fax calls as well as voice calls. Such telephone line sharing enables modem and fax communication while avoiding the cost of providing separate modem telephone lines and fax telephone lines in the small business or home office.

In such small business or home office environments, a telephony subsystem of the personal computer typically performs the telephone line interface functions required for modem, fax and sometimes voice communication. The telephone line interface functions include line seizure and ring detect, as well as audio and digital signal processing functions.

Typically, application programs executing on the personal computer perform the higher level modem, fax and voice communication functions as well as user interface functions. For example, a fax application program on the personal computer controls fax transfers over the shared telephone line through a driver program for the telephony subsystem.

In a typical small business or home office telephone line topology, the telephony subsystem is coupled to an incoming telephone line or a private branch exchange (PBX) line. One or more extension telephones and a telephone answering machine are typically coupled to the incoming telephone line in parallel with the telephony subsystem. The telephony subsystem usually drives one or more serial telephones over a local line.

Typically in such systems, the telephony subsystem initially determines whether an incoming call is a fax by going off hook and thus picking up the line, and attempting to sense a fax calling tone while transmitting a simulated ringback tone over the telephone line. If the fax calling tone is detected, then the telephony subsystem picks up the telephone line and transmits a fax response tone over the telephone line. Thereafter, the fax application program performs a fax data transfer through the telephony subsystem.

If the telephony subsystem does not detect the fax calling tone with the incoming call, then the incoming call is typically assumed to be a voice call. The telephony subsystem rings the serial telephone to enable a user to receive the voice call and couples the incoming line to the local line when the serial telephone is picked up.

Unfortunately, such prior telephony subsystems cannot properly process incoming calls from a data modem and manual fax. Such devices call and wait for a response tone rather than transmit a calling tone. As a consequence, the telephony subsystem in such a prior system usually assumes that an incoming call from a data modem or manual fax is a voice call and rings the serial telephone. The user picking up the serial telephone perceives silence on the telephone line because the data modem or the manual fax is waiting for a response tone.

Moreover, such telephony subsystems ring only the serial telephones coupled to the local line. As a consequence, the parallel telephones coupled to the incoming telephone line do not achieve full utility.

SUMMARY AND OBJECTS OF THE INVENTION

One object of the present invention is to enable a personal computer to share a telephone line for voice calls, data modem calls and fax calls.

Another object of the present invention is to share a telephone line coupled to a personal computer for voice calls, data modem calls and fax calls and to enable ringing of parallel extensions on the telephone line during incoming calls, and to allow voice calls to be handled by the telephones or answering machines attached to those extensions.

Another object of the present invention is to provide an off-hook detection circuit to detect a pick up by a parallel extension on the telephone line while maintaining high impedance (i.e., on-hook) and high voltage isolation between the personal computer and the telephone line.

A further object of the present invention is to provide a soft line seizure circuit that prevents a central office hang up after the parallel extension hangs up, while at the same time not causing an answering machine on the parallel extension to prematurely hang up due to the presence of the personal computer system on the telephone line, and to maintain high voltage isolation between the personal computer and the telephone line.

These and other objects of the invention are provided by a method and apparatus for processing an incoming call on a telephone line in a computer system. A telephony circuit in the computer system couples the telephone line to a serial telephone over a local line, such that a ring signal for an incoming call over the telephone line causes the serial telephone to ring along with at least one parallel telephone. The telephony circuit then detects an incoming call on the telephone line and detects a pick-up by a parallel device coupled to the telephone line.

The telephony circuit then connects the soft line seizure circuit to the telephone line, which allows the personal computer system to unobtrusively monitor the line for fax or data modem calling tones. Since the soft line seizure draws no DC loop current while the parallel device is off-hook, the telephony circuit will not disturb the operation of the parallel device.

If the telephony circuit detects a fax calling tone on the telephone line, the telephony circuit seizes the telephone line according to a hard line seizure to cause the parallel device, if it is an answering machine, to hang-up. The telephony circuit then sends a fax answer tone over the telephone line and performs a fax transfer over the telephone line. A similar action may take place with data modem calls that send a data calling tone.

If the telephony circuit does not detect a fax calling tone on the telephone line, after the parallel device hangs up, the telephony circuit seizes the telephone line according to a soft line seizure, such that the soft line seizure holds a tip to ring voltage of the telephone line to a soft seizure level, thus preventing the central office or PBX from hanging up the line. The telephony circuit then sends an answer tone over the telephone line and performs a data modem or a manual fax transfer over the telephone line.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
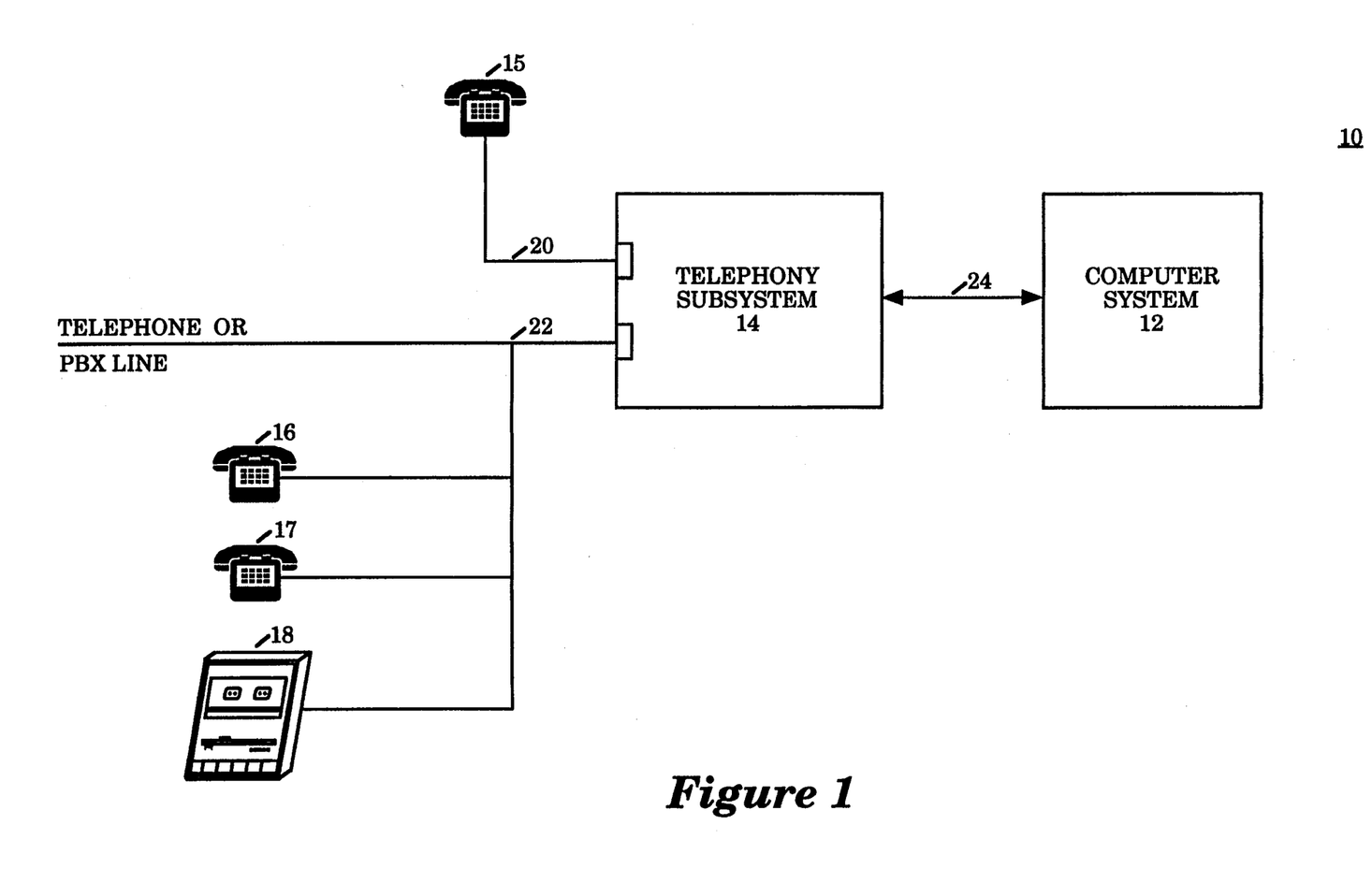
FIG. 1 is an illustration of a small business or home office telephone system for one embodiment which includes a personal computer that receives incoming calls and transmits outgoing calls over a telephone line.

FIG. 1 illustrates a small business or home office telephone system 10 for one embodiment. The telephone system 10 includes a personal computer system 12, and a telephony subsystem 14. The personal computer system 12 and the telephony subsystem 14 communicate over a serial communication line 24.

The telephony subsystem 14 receives incoming calls and transmits outgoing calls over a telephone line 22. The telephone line 22 comprises a standard telephone line or alternatively a private branch exchange (PBX) line. A pair of telephones 16 and 17, along with a telephone answering machine 18 are coupled to the telephone line 22 in parallel with the telephony subsystem 14. A serial telephone 15 is coupled to the telephony subsystem 14 over a local line 20.

Figure 2:
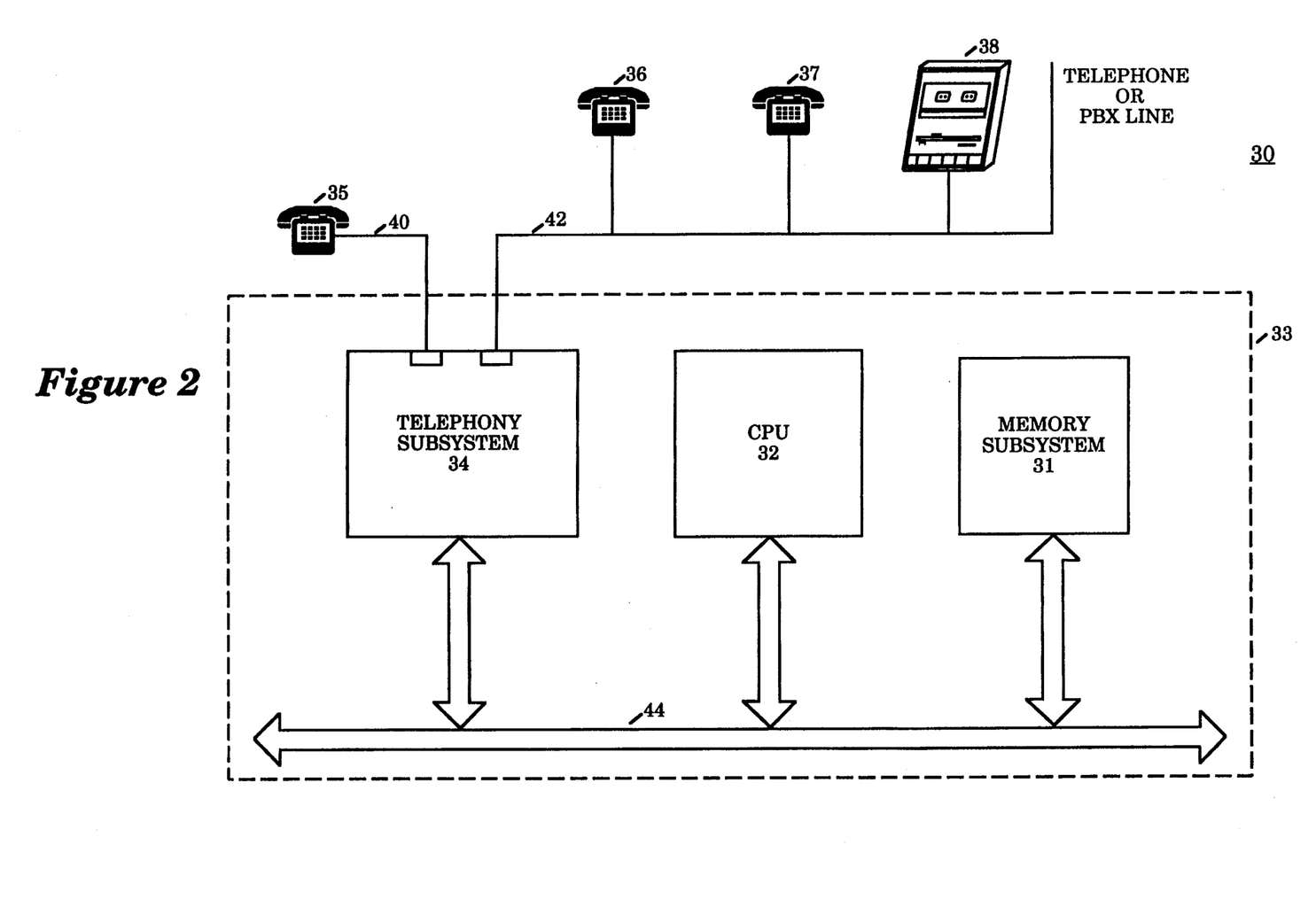
FIG. 2 is an illustration of a small business or home office telephone system which includes a personal computer system comprising a central processing unit, a memory subsystem, and a telephony subsystem.

FIG. 2 illustrates a small business or home office telephone system 30 for an alternative embodiment. The telephone system 30 includes a personal computer system 33 comprising a central processing unit (CPU) 32, a memory subsystem 31, and a telephony subsystem 34. The CPU 32, the memory subsystem 31, and the telephony subsystem 34 communicate over the host bus 44.

The telephony subsystem 34 receives incoming calls and transmits outgoing calls over a telephone line 42. The telephone line 42 comprises a standard telephone line or alternatively a PBX line. A pair of telephones 36 and 37, along with a telephone answering machine 38 are coupled to the telephone line 42 in parallel with the telephony subsystem 34. A serial telephone 35 is coupled to the telephony subsystem 34 over a local line 40.

Figure 3:
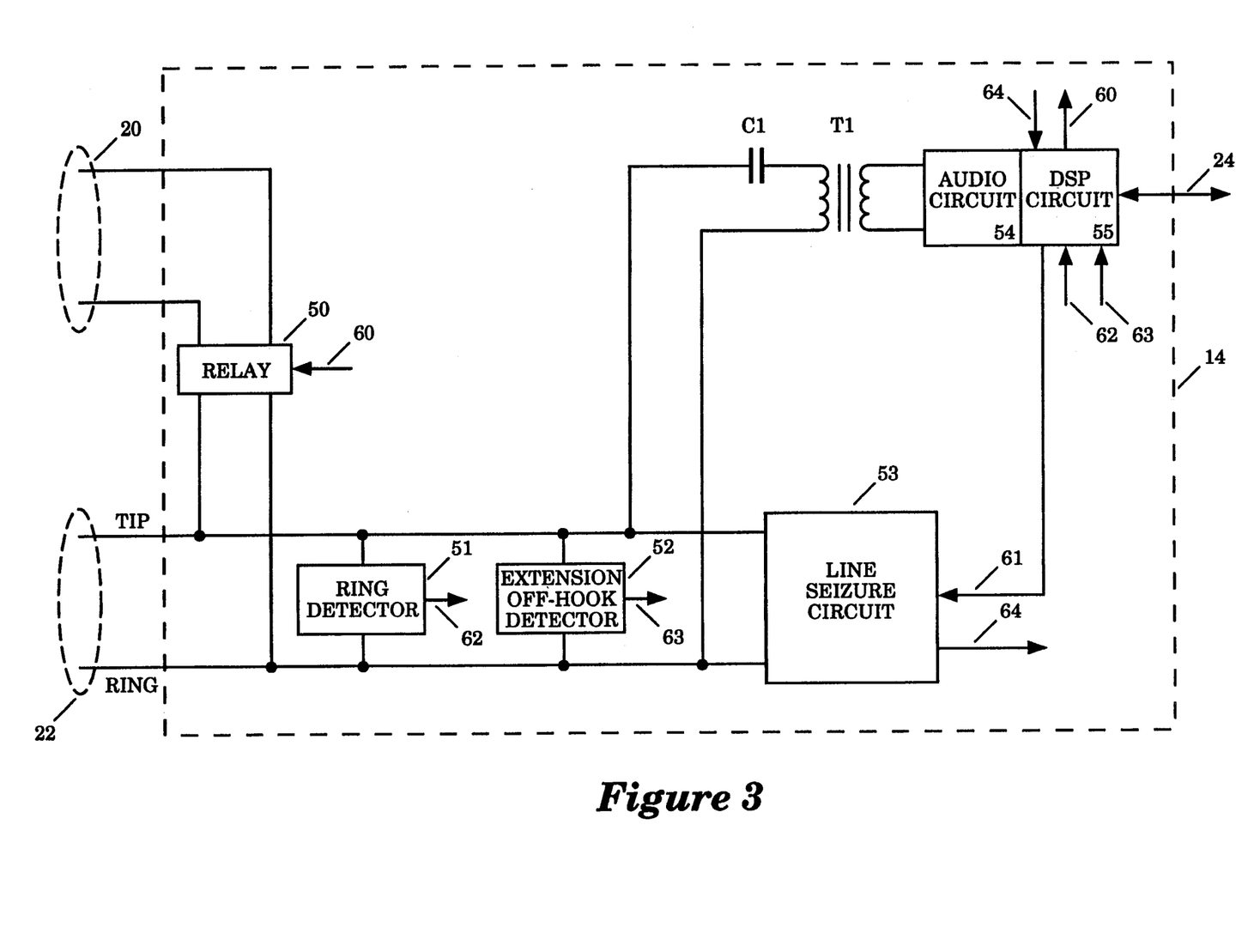
FIG. 3 is a diagram illustrating the telephony subsystem which comprises a ring detector circuit, an extension off-hook detector circuit, a line seizure circuit, an audio circuit, and a digital signal processing (DSP) circuit.

FIG. 3 is a diagram illustrating the telephony subsystem 14. The telephony subsystem 14 comprises a ring detector circuit 51, an extension off-hook detector circuit 52, a line seizure circuit 53, an audio circuit 54, and a digital signal processing (DSP) circuit 55. The telephone line 22 comprises a tip node and a ring node.

The DSP circuit 55 comprises a DSP processor, a control store memory, as well as a serial interface circuit for communicating with the personal computer system 12 over the serial line 24. The DSP circuit 55 implements telephony algorithms for performing data modem transfers, as well as automated and manual fax transfers over the telephone line 22.

The DSP circuit 55 employs the ring detector circuit 51, the extension off-hook detector circuit 52, the line seizure circuit 53, and a relay circuit 50 to process incoming calls over the telephone line 22.

The ring detector circuit 51 detects a 15–68 Hz ring signal on the telephone line 22 from either a telephone central office or a PBX. The ring detector circuit 51 generates a ring detect signal 62. The DSP circuit 55 senses the ring detect signal 62 to determine whether a ring is occurring on the telephone line 22.

The extension off-hook detector 52 detects whether the telephone line 22 is in an off-hook state. The extension off-hook detector 52 generates an off-hook signal 63. The DSP circuit 55 senses the off-hook signal 63 to determine whether the telephone line 22 is in the off-hook state, i.e., whether or not device 15, 16, 17 or 18 in FIG. 1 is off-hook.

The line seizure circuit 53 is a direct current (DC) current sink for telephony communication over the telephone line 22. The line seizure circuit 53 seizes the telephone line 22 in either a hard line seizure mode or a soft line seizure mode. The DSP circuit 55 controls the hard and soft line seizure modes by generating a set of seizure mode signals 61.

The DSP circuit 55 selectively couples the telephone line 22 to the local line 20 by generating a control signal 60 to the relay 50.

The audio circuit 54 transmits and receives audio signals over the telephone line 22 through a transformer T1 under control of the DSP circuit 55. A capacitor C1 blocks DC signals from the audio circuit 54.

The capacitor C1, the transformer T1, and the audio circuit 54 comprises an AC signal path from the telephone line 22. The ring detector circuit 51, the extension off-hook detector circuit 52, and the line seizure circuit 53 comprise a DC signal path from the telephone line 22.

Figure 4:
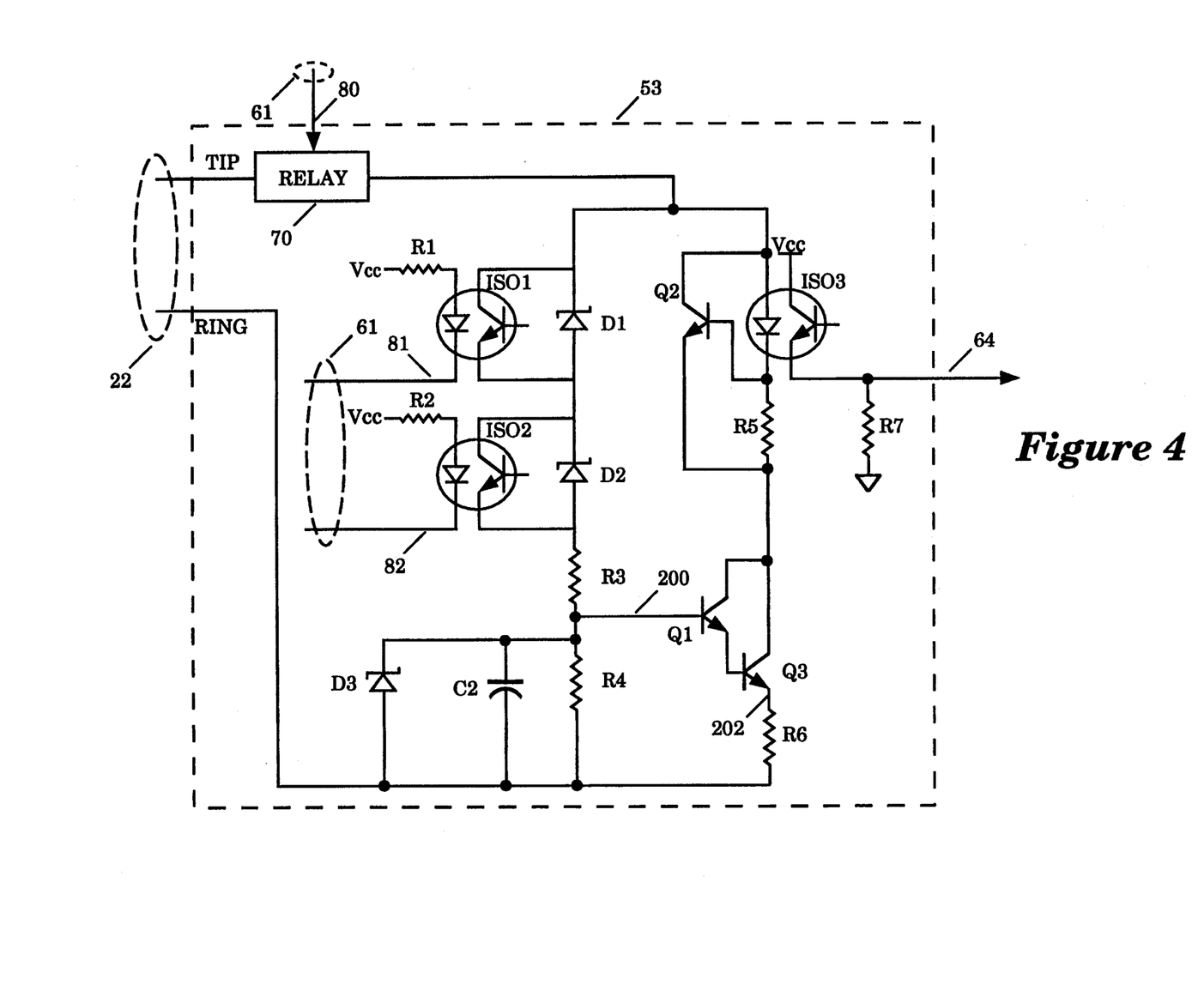
FIG. 4 is an illustration of the line seizure circuit that performs hard line seizure and soft line seizure of the telephone line.

FIG. 4 illustrates the line seizure circuit 53. The line seizure circuit 53 employs a darlington transistor pair comprising a transistor Q2 and a transistor Q3. The darlington transistor pair Q2 and Q3 are biased by a pair of zener diodes D1 and D2 and a pair of resistors R3 and R4. A capacitor C2 is employed to reduce the AC gain of the darlington transistor pair Q2 and Q3 toward zero.

The seizure mode signals 61 comprise a control signal 80 for controlling a relay circuit 70, a control signal 81 for controlling an opto coupler ISO1, and a control signal 82 for controlling an opto-coupler ISO2.

The DSP circuit 55 generates the control signals 81 and 82 to select one of two soft line seizure modes or the hard line seizure mode. The DSP circuit 55 generates the control signal 80 to cause the relay 70 to selectively couple the line seizure circuit 53 to the telephone line 22, and thereby control line seizure in the selected mode.

Figure 5:
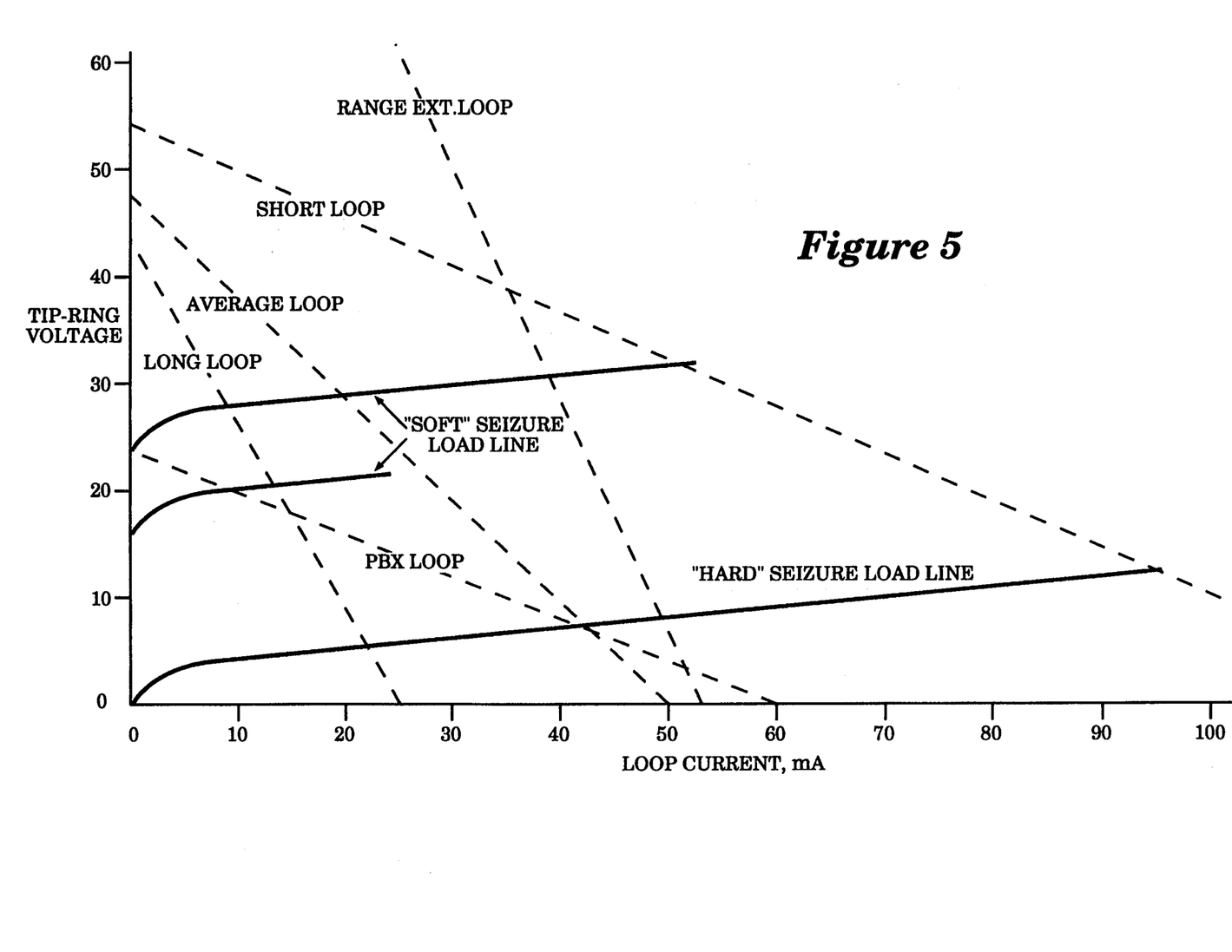
FIG. 5 illustrates the load lines for a set of central office to subscriber loops over the telephone line, as well as the load lines for the differing line seizure modes of the line seizure circuit.

FIG. 5 illustrates the load lines for a set of central office to subscriber loops over the telephone line 22, as well as the load lines for the differing line seizure modes of the line seizure circuit 53. The intersection of a load line for a given loop and a load line for a given line seizure mode specifies a voltage and current point for the line seizure circuit 53, when no other telephone devices on the line are in the off-hook state.

The voltage and current characteristics illustrated correspond to DC signals on the telephone line 22. The line seizure circuit 53 maintains a high impedance to audio frequency signals.

The telephony subsystem 14 employs the hard line seizure mode to provide the standard V-I characteristic to go off-hook and seize the telephone line 22. The telephony subsystem 14 employs one of the two soft line seizure modes after a telephone device on a parallel extension has seized the telephone line 22.

The DSP circuit 55 activates one of the soft line seizure modes after determining that a parallel extension (the telephones 16 or 17 or the telephone answering machine 18) has gone off-hook. The particular soft seizure mode is predetermined at configuration time based on the characteristics of the telephone line 22.

The DSP circuit 55 determines whether a parallel extension has gone off-hook by sensing the off-hook signal 63 from the extension off-hook detector circuit 52. Alternatively, the DSP circuit 55 determines that a parallel extension has gone off-hook by sensing audio tones on the telephone line 22 through the audio circuit 54.

While a parallel extension is off-hook, the line seizure circuit 53 draws no loop current in the soft seizure mode because the tip to ring voltage is below the turn on point of the soft line seizure load line.

The lack of loop current drawn by the line seizure circuit 53 in the soft line seizure mode prevents the telephone answering machine 18 from hanging up while off-hook to answer an incoming call. The telephone answering machine 18 continues to process the incoming call normally.

After the off-hook device on the parallel extension hangs up, the tip to ring voltage rises until the line seizure circuit 53 in the soft line seizure mode draws a substantial amount of loop current on the telephone line 22. The line seizure circuit 53 in the soft line seizure mode prevents the telephone line 22 from being dropped.

When the line seizure circuit 53 in the soft line seizure mode starts drawing loop current, a loop current signal 64 goes active to indicate that the device on the parallel extension has hung up. The telephony subsystem 14 then transmits an answer tone over the telephone line 22 to determine whether the incoming call is a data modem or a fax device that does not generate a calling tone.

The DSP circuit 55 sets a first soft line seizure mode by generating the control signals 81 and 82 to switch both the ISO1 and ISO2 off. The DSP circuit 55 sets a second soft line seizure mode by generating the control signals 81 and 82 to switch on only one of the opto-couplers ISO1 or ISO2. The second soft line seizure mode is employed if the telephone line 22 is coupled to a PBX having a lower supply voltage than a central office telephone line.

The DSP circuit 55 performs a hard line seizure of the telephone line 22 by generating the control signals 81 and 82 to switch both the ISO1 and ISO2 on, thereby bypassing the zener diodes D1 and D2. The DSP circuit 55 then generates the control signal 80 which causes the relay 70 to couple the line seizure circuit 53 to the telephone line 22.

In the hard line seizure mode, the DC voltage at a node 200 is $cV_{TR}$, where $c=R4/(R3+R4)$ (ignoring any Q2 base current) and $V_{TR}$ is the tip to ring voltage of the telephone line 22. The node 200 is 2 diode drops ($2\phi$) above the voltage at a node 202. The voltage at the node 202 is equal to $I \times R6$, where I is the loop current through the line seizure circuit 53 (assuming high $h_{FE}$'s for the transistors Q2 and Q3). The voltage at the node 200 is $cV_{TR}=2\phi+I\times R6$. Therefore, $I=V_{TR}/(R6/c)-2\phi/R6$. As a consequence, the line seizure circuit 53 approximates the DC characteristics of a resistor with value $R6/c$, offset by a voltage of $2\phi/c$. The hard line seizure mode is shown on the bottom load line on FIG. 5.

A capacitor C2 bypasses the base of the transistor Q2 to ground, thereby reducing the gain of the darlington transistor pair Q2 and Q3 toward zero for audio AC signals. The capacitor C2 ensures that the line seizure circuit 53 presents a high impedance to the telephone line 22 in the audio band. A zener diode D3 limits the voltage across the capacitor C2 during off-hook voltage surges to a safe level.

While the ISO2 is switched off and the ISO1 is switched on, the load line is shifted by the breakdown voltage of the zener diode D2, i.e. 10 volts, as shown by the middle load line of FIG. 5.

While the ISO2 is switched off and the ISO1 is switched off, the load line is shifted to the top load line of FIG. 5.

While loop current is flowing through the line seizure circuit 53, the ISO3 switches on, thereby activating the loop current signal 64. The transistor Q1 and the resistor R5 shunt current around the light emitting diode (LED) portion of the ISO3 for high loop current levels, thereby limiting the LED current to a safe level.

Figure 6:
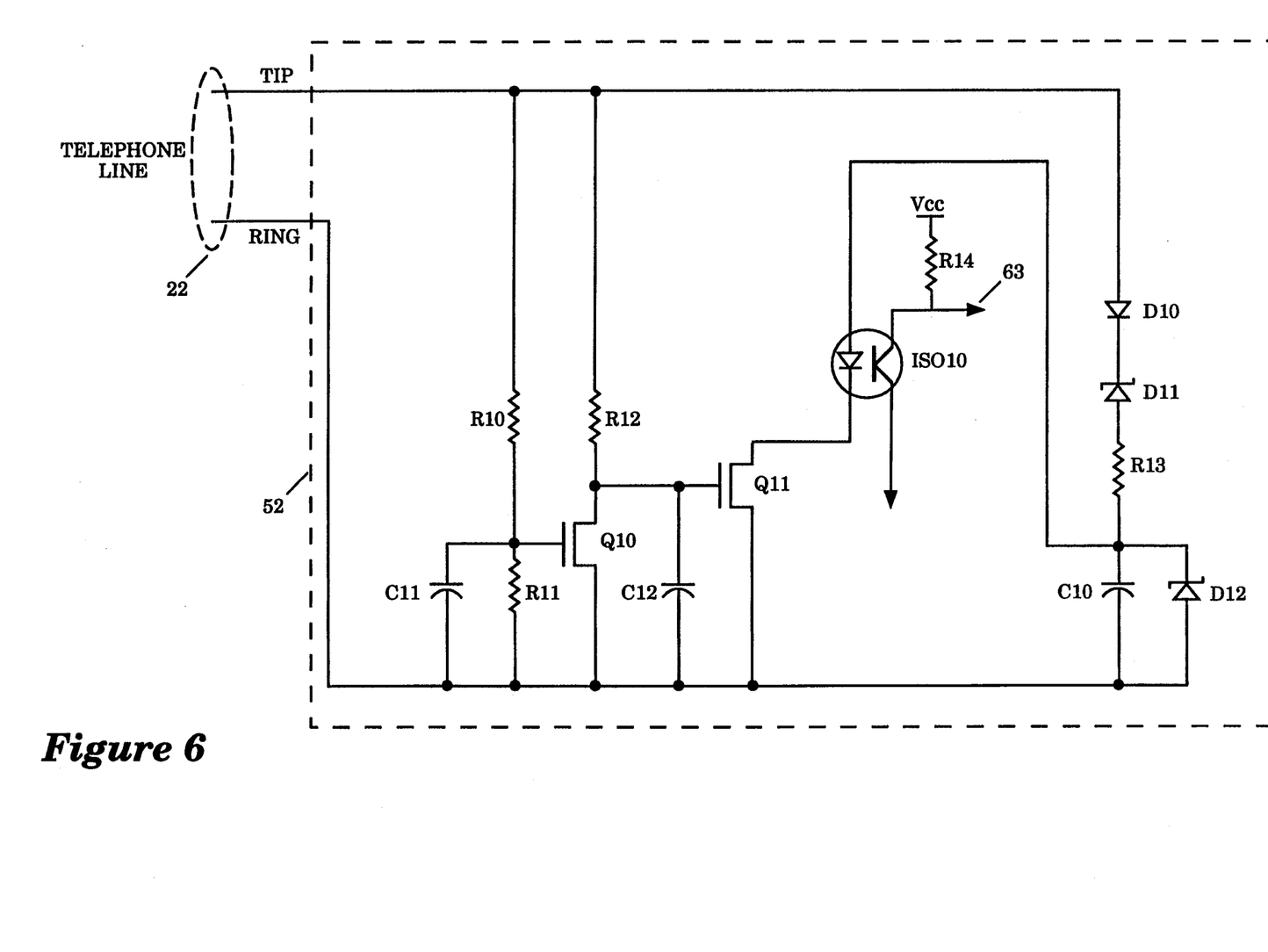
FIG. 6 is a diagram illustrating the extension off-hook detector circuit which senses a drop in the tip to ring voltage on the telephone line caused by a parallel extension going off hook in response to an incoming call.

FIG. 6 illustrates the extension off-hook detector circuit 52. The extension off-hook detector circuit 52 senses a drop in the tip to ring voltage on the telephone line 22 caused by a parallel extension going off hook in response to an incoming call. The extension off-hook detector circuit 52 generates the off-hook signal 63 indicating whether the telephone line 22 is in the off hook state.

The extension off-hook detector circuit 52 also meets Federal Communication Commission (FCC) part 68 requirements for on-hook impedance and leakage. The extension off-hook detector circuit 52 provides for a 1500 volt isolation between the telephone line 22 and the telephony subsystem 14.

During an incoming ring on the telephone line 22, the voltage peaks of the ring signal switch on a diode D10 and a zener diode D11 and charge up a capacitor C10 through a resistor R13. A zener diode D12 limits the voltage on the capacitor C10 to a safe level.

The zener diode D11 insures the DC resistance of the extension off-hook detector circuit 52 is at a high level for DC voltages below 100 volts as required by FCC part 68.312. The resistor R13 satisfies the 150 k ohm isolation requirements for voltages between 100 and 200 volts on the telephone line 22 specified by FCC part 68.

The first ring signal on the telephone line 22 for an incoming call charges the capacitor C10 to approximately 10 volts. If the telephones 16 and 17 and the telephone answering machine 18 are all on hook, then the tip to ring voltage $V_{TR}$ is approximately 48 volts and the transistor Q10 is switched on. A capacitor C11 filters the effect of ring signals and dial pulsing to ensure that the extension off-hook detector circuit 52 responds only to DC voltage levels. The transistor Q11 is switched off while the transistor Q10 is switched on. A capacitor C12 reduces the sensitivity of the gate of the transistor Q11 to noise. The transistor Q11 is an enhancement mode field effect transistor.

If one of the telephones 16 or 17 or the telephone answering machine 18 goes off-hook, then the tip-ring voltage $V_{TR}$ drops. The drop in the tip-ring voltage $V_{TR}$ switches off the transistor Q10 and switches on the transistor Q11, which causes current from the capacitor C10 to flow through the LED portion of the ISO10. The current flow through the LED portion of the ISO10 causes the off-hook signal 63 to go active while the capacitor C10 discharges. The off-hook signal 63 indicates that the telephone line 22 has been seized by a parallel device.

Figure 7:
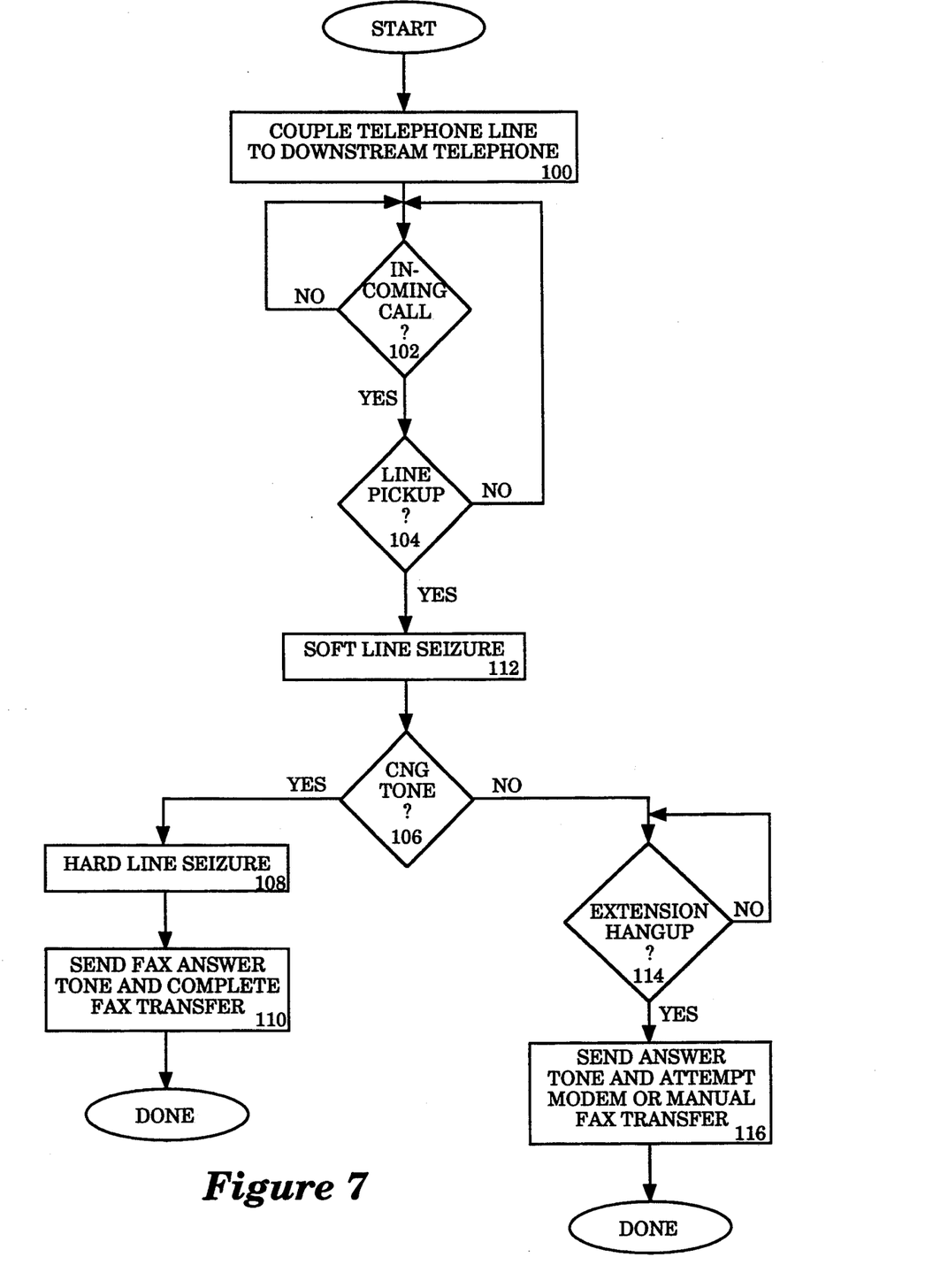
FIG. 7 illustrates a method for handling an incoming call on the telephone line.

FIG. 7 illustrates a method for handling an incoming call on the telephone line 22. At block 100, the DSP circuit 55 generates the control signal 60 to cause the relay 50 to couple the telephone line 22 to the local line 20. Thereafter, a ring signal for an incoming call over the telephone line 22 causes the serial telephone 15 to ring along with the parallel telephones 16 and 17.

At decision block 102, the DSP circuit 55 waits for an incoming call on the telephone line 22. The DSP circuit 55 senses the ring detect signal 62 from the ring detector circuit 51 to determine whether an incoming call is received on the telephone line 22. After the incoming call is detected, control proceeds to decision block 104.

At decision block 104 the DSP circuit 55 waits for a line pick-up by a parallel device. If the telephone 16, the telephone 17, or the serial telephone 15 does not cause a line pick-up, then the telephone answering machine 18 eventually picks-up the telephone line 22. The extension off-hook detector circuit 52 senses the line pick-up and generates the off-hook signal 63. The DSP circuit 55 senses the off-hook signal 63 to detect the line pick-up.

Alternatively, the DSP circuit 55 detects a line pick-up by sensing audio tones on the telephone line 22 through the audio circuit 54. After the line pick-up is detected, control proceeds to decision block 112.

At decision block 112, the DSP circuit 55 causes the line seizure circuit 53 to the telephone line 22 in soft line seizure mode. The DSP circuit 55 sets a line seizure mode by generating the control signals 81 and 82 to switch the ISO1 and the ISO2 as previously described. The DSP circuit 55 also generates the control signal 80 to cause the relay 70 to couple the line seizure circuit 53 to the telephone line 22. Since another telephone device has picked up the line, the soft line seizure mode has no effect on the tip to ring voltage. Control then proceeds to decision block 106.

At decision block 106, the DSP circuit 55 attempts to detect a calling tone from a fax over the telephone line 22. The DSP circuit 55 senses calling tones through the AC path of the telephony subsystem 14 and the audio circuit 54. If a fax calling tone is detected at decision block 106, then control proceeds to block 108.

At block 108, the DSP circuit 55 performs a hard line seizure of the telephone line 22. The DSP circuit 55 performs the hard line seizure by generating the control signals 81 and 82 to switch on both the ISO1 and ISO2 of the line seizure circuit 53. The DSP circuit 55 also generates the control signal 80 to cause the relay 70 to couple the line seizure circuit 53 to the telephone line 22. The line seizure circuit 53 in the hard line seizure mode pulls the tip to ring voltage of the telephone line 22 to a low level. If the telephone answering machine 18 had picked up the line, this low tip to ring voltage will cause the answering machine to hang up.

Thereafter at block 110, the DSP circuit 55 sends a fax answer tone over the telephone line 22 and completes a fax transfer.

If a calling tone is not detected at decision block 106, then control proceeds to block 114.

Thereafter at decision block 114, the DSP circuit 55 waits for the off-hook parallel extension or the off-hook serial telephone 15 to hang-up. If the answering machine 18 is off-hook, the DSP circuit 55 waits while the answering machine 18 plays the greeting message and then hangs up. When the other telephone device hangs up, the line seizure circuit 53 will perform a soft line seizure of the telephone line 22, as previously configured. The DSP circuit 55 detects the line hang-up by sensing the loop current signal 64 from the line seizure circuit 53. When the line hang-up is detected, control proceeds to block 116.

At block 116, the DSP circuit 55 transmits an answer tone over the telephone line 22 and attempts a data modem transfer sequence or a manual fax transfer sequence over the telephone line 22.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for processing an incoming call on a telephone line in a computer system, comprising the steps of:

coupling the telephone line to a telephone over a local line, such that a ring signal for the incoming call over the telephone line causes the telephone to ring along with at least one telephone extension coupled to the telephone line in parallel with the telephone;

detecting the incoming call on the telephone line;

detecting a pick-up by an extension device coupled to the telephone line in parallel with the telephone;

if a fax calling tone is detected on the telephone line, then seizing the telephone line according to a hard line seizure to cause the extension device to hang-up, then sending a fax answer tone over the telephone line and generating a fax transfer over the telephone line;

if a fax calling tone is not detected on the telephone line, then seizing the telephone line according to a soft line seizure, the soft line seizure holding a tip to ring voltage of the telephone line to a soft seizure level after the extension device hangs up, then sending an answer tone over the telephone line and generating a data modem or a manual fax transfer over the telephone line.

2. The method of claim 1, wherein the step of detecting the incoming call on the telephone line comprises the step of detecting the ring signal on the telephone line.

3. The method of claim 1, wherein the extension device comprises a telephone answering machine.

4. The method of claim 1, wherein the step of detecting a pick-up by an extension device comprises the step of detecting an off hook level of the tip to ring voltage for the telephone line while maintaining a high voltage isolation between the telephone line and the computer system and an on-hook tip to ring impedance.

5. The method of claim 1, wherein the step of detecting a pick-up by an extension device comprises the step of sensing audio tones on the telephone line.

6. The method of claim 1, wherein the soft seizure level of the tip to ring voltage on the telephone line prevents a central office for the telephone line from hanging up after the extension device hangs up.

7. An apparatus for processing an incoming call on a telephone line in a computer system, comprising:
    means for coupling the telephone line to a telephone over a local line, such that a ring signal for the incoming call over the telephone line causes the telephone to ring along with at least one telephone extension coupled to the telephone line in parallel with the telephone;
    means for detecting the incoming call on the telephone line;
    means for detecting a pick-up by an extension device coupled to the telephone line in parallel with the telephone;
    means for seizing the telephone line according to a hard line seizure to cause the extension device to hang-up, then sending a fax answer tone over the telephone line and generating a fax transfer over the telephone line if a fax calling tone is detected on the telephone line;
    means for seizing the telephone line according to a soft line seizure, the soft line seizure holding a tip to ring voltage of the telephone line to a soft seizure level after the extension device hangs up, then sending an answer tone over the telephone line and generating a data modem or a manual fax transfer over the telephone line if a fax calling tone is not detected on the telephone line.

8. The apparatus of claim 7, wherein the means for detecting the incoming call on the telephone line comprises means for detecting the ring signal on the telephone line.

9. The apparatus of claim 7, wherein the extension device comprises a telephone answering machine.

10. The apparatus of claim 7, wherein the means for detecting a pick-up by an extension device comprises means for detecting an off hook level of the tip to ring voltage for the telephone line while maintaining a high voltage isolation between the telephone line and the computer system and an on-hook tip to ring impedance.

11. The apparatus of claim 7, wherein the means for detecting a pick-up by an extension device comprises means for sensing audio tones on the telephone line.

12. The apparatus of claim 7, wherein the soft seizure level of the tip to ring voltage on the telephone line prevents a central office for the telephone line from hanging up after the extension device hangs up.

13. A telephony subsystem for a computer system, comprising:
    extension off-hook detector circuit capable of detecting a pick-up by an extension device coupled a telephone line from a central office;
    line seizure circuit having circuitry for performing either a hard line seizure On the telephone line or a soft line seizure on the telephone line while the extension device is off-hook, wherein the hard line seizure causes the extension device to hang-up, and wherein the soft line seizure does not cause the extension device to hang-up and wherein the soft line seizure prevents the central office from disconnecting the telephone line after the extension device hangs up.

14. The telephony subsystem of claim 13, wherein the soft line seizure holds a tip to ring voltage of the telephone line to a soft seizure level, such that the soft seizure level on the telephone line prevents the central office from disconnecting the telephone line.

15. The telephony subsystem of claim 13, wherein the extension off-hook detector circuit detects the pick-up by detecting an off hook level of a tip to ring voltage on the telephone line.

16. The telephony subsystem of claim 15, wherein the extension off-hook detector circuit maintains a high voltage isolation between the telephone line and the computer system.

17. The telephony subsystem of claim 15, wherein the extension off-hook detector circuit maintains an on-hook tip to ring impedance on the telephone line while detecting the off hook level of the tip to ring voltage on the telephone line.

18. The telephony subsystem of claim 13, wherein the extension off-hook detector circuit detects the pick-up by detecting audio tones on the telephone line.

19. The telephony subsystem of claim 13, further comprising a circuit for selectively coupling the telephone line to a telephone coupled to a local line, such that a ring signal for an incoming call over the telephone line causes the telephone to ring.

20. The telephony subsystem of claim 19, further comprising a ring detector circuit coupled to detect the ring signal on the telephone line.

* * * * *